United States Patent [19]

Cohen et al.

[11] Patent Number: 5,260,424
[45] Date of Patent: Nov. 9, 1993

[54] B-(KETO OR SULFONYL) ESTERS FROM REACTION OF SILYLKETENE ACETAL AND ACYL OR SULFONYL COMPOUND

[75] Inventors: Gordon M. Cohen, Wynnewood, Pa.; Hans J. Reich, Madison, Wis.

[73] Assignee: E. I. Du Pont de Nemours and Company, Wilmington, Del.

[21] Appl. No.: 829,245

[22] Filed: Feb. 3, 1992

Related U.S. Application Data

[60] Division of Ser. No. 570,458, Aug. 21, 1990, Pat. No. 5,110,869, which is a division of Ser. No. 366,120, Apr. 11, 1989, Pat. No. 4,983,679, which is a continuation-in-part of Ser. No. 48,958, May 19, 1987, abandoned, and a continuation-in-part of Ser. No. 8,960, Jan. 30, 1987, abandoned, and a continuation-in-part of Ser. No. 868,083, May 29, 1986, abandoned.

[51] Int. Cl.$^5$ .............................. C08F 8/10; C08F 8/36
[52] U.S. Cl. ........................................ 525/194; 525/286; 525/299; 525/303; 525/308; 525/309; 525/359.3; 525/359.4; 525/346; 525/350; 525/353; 525/377; 525/386; 526/194; 560/145; 560/150; 560/174; 560/176; 560/178
[58] Field of Search ............... 560/145, 150, 174, 176, 560/178; 525/194, 286, 299, 303, 308, 309, 359.3, 359.4, 353, 350, 346, 377, 386; 526/194

[56] References Cited

U.S. PATENT DOCUMENTS

| | | | |
|---|---|---|---|
| 3,730,930 | 5/1973 | Labanna | 260/23 |
| 3,817,946 | 6/1974 | Ree | 260/79 |
| 4,027,066 | 5/1977 | Vitorius | 426/334 |
| 4,346,144 | 8/1982 | Craven | 428/335 |
| 4,388,448 | 6/1983 | Melby | 525/327.3 |
| 4,414,372 | 11/1983 | Farnham et al. | 526/190 |
| 4,417,034 | 11/1983 | Webster | 526/190 |
| 4,482,729 | 11/1984 | Ishikawa et al. | 556/446 |
| 4,508,880 | 4/1985 | Webster | 526/190 |
| 4,524,196 | 6/1985 | Farnham et al. | 526/190 |
| 4,581,428 | 4/1986 | Farnham et al. | 526/190 |
| 4,588,795 | 5/1986 | Dicker et al. | 526/192 |
| 4,598,161 | 7/1986 | Farnham et al. | 564/101 |
| 4,605,716 | 8/1986 | Hertler | 526/190 |
| 4,622,372 | 11/1986 | Dicker et al. | 526/190 |
| 4,656,233 | 4/1987 | Hertler et al. | 526/190 |
| 4,681,918 | 7/1987 | Webster | 525/282 |
| 4,711,942 | 12/1987 | Webster | 526/185 |
| 4,822,859 | 4/1989 | Segah | 525/326.7 |
| 5,110,869 | 5/1992 | Cohen et al. | 525/359.3 |

FOREIGN PATENT DOCUMENTS

| | | |
|---|---|---|
| 701643 | 1/1965 | Canada . |
| 1076133 | 2/1960 | Fed. Rep. of Germany . |
| 3302847 | 11/1983 | Fed. Rep. of Germany . |
| 53-034719 | 3/1978 | Japan . |
| 59-213701 | 3/1984 | Japan . |
| 842725 | 7/1960 | United Kingdom . |

OTHER PUBLICATIONS

Wissner, J. Org. Chem., 44 (25), 4617 (1979).
Rousseau et al., Tetrahedron Lett., 26(35), 4191 (1985).
Chem Abstr., vol. 61, No. 33, Aug. 1964, Abstr. No. 4209, Compt. Rend. 258(19), 4783-4 (1964).
Rathke et al., "Condensation of o-silyl ketene Acetals . . . ", Tetrahedron Lett., 1297 (1973).
Noyori et al., "Trimethysilyl Triflate in Organic Synthesis", Tet., 37, 3899 (1981).
Tirpak et al., "Acylation of Ketone Silyl Erol Ethers with Acc Chlorides . . . ", J. Org. Chem., 47, 5099 (1982).
Kramarova et al., J. Gen. Chem. USSR, 43, 1843 (1973).
Kramarova et al., J. Gen. Chem. USSR, 45, 469 (1975).
Burlachenko et al., J. Gen. Chem., USSR, 43, 1708 (1973).
Webster et al., "Group Transfer Polymerization . . . ", J. Am. Chem. Soc. 105, 5706 (1983).
Olofson et al., "A Regiospecific and Stereospecific Route to End Carbo. Tetrahedron Lett"., 21, 819 (1980).
Colvin, "Silicon in Organic Synthesis", p. 234, Butterworths, Boston (1991).

Primary Examiner—Robert E. Sellers

[57] ABSTRACT

Silylketene acetals, including "living" GTP polymers, are acylated or sulfonylated in the presence of GTP-effective catalysts with acyl or sulfonyl compounds to produce β-ketoesters or β-sulfonylesters; polymeric products, including capped, coupled and chain-extended polymers and block copolymers can be prepared.

9 Claims, No Drawings

B-(KETO OR SULFONYL) ESTERS FROM REACTION OF SILYLKETENE ACETAL AND ACYL OR SULFONYL COMPOUND

CROSS-REFERENCE TO RELATED APPLICATIONS

This is a divisional application of Ser. No. 07/570,458, filed on Aug. 21, 1990, now U.S. Pat. No. 5,110,869, which is a divisional of application Ser. No. 07/366,120 filed Apr. 11, 1989, now U.S. Pat. No. 4,983,679, which is a continuation-in-part of Ser. No. 048,958 filed on May 19, 1987, now abandoned, as a continuation-in-part of application Ser. No. 008,960 filed Jan. 30, 1987, now abandoned, as a continuation-in-part of application Ser. No. 868,083 filed on May 29, 1986, now abandoned.

BACKGROUND OF THE INVENTION

1. Field of the Invention

This invention relates to durable epoxy (meth)acrylic polymers with oxirane-containing terminal groups; to processes for preparing beta-ketoesters and beta-sulfonylesters from silylketene acetals; and to block and chain-extended polymers prepared therewith.

2. Background

Epoxy resins are widely used today in surface coatings, adhesives, castings, laminates, and encapsulation of electronic parts. Most of these epoxy resins are prepared by the reaction of 2,2-bis(4'-hydroxyphenyl)propane [bisphenol A] and epichlorohydrin. This generates a polymer with a backbone composed of ether links between bisphenol A structures and hydroxy propylene moieties. There is also one epoxy group (oxirane) at each end of the polymer backbone. These resins can be cured by reacting their epoxy groups with crosslinking agents, such as anhydrides, amines, and acids. When cured, the epoxides have good tensile strengths, excellent electrical insulating properties, and have outstanding adhesion to many surfaces.

However, a major weakness of these conventional epoxy resins is their poor outdoor durability. The ether links in their backbone as well as the aromatic rings lead to poor UV and oxidative stability. Because of this limitation, these epoxy resins cannot be used in systems that require long term outdoor exposure.

Previously, two approaches have been taken to make durable epoxides. One involves the synthesis and use of low molecular weight cyclic or acyclic diepoxides and the other involves the synthesis and use of copolymers of glycidyl methacrylate (GMA). Both of these approaches, although they generate epoxies that are more durable than bisphenol A based resins, have significant deficiencies. The cyclic-type of epoxies are not polymers and have only very low molecular weight segments binding the two epoxy groups. These materials tend not to have the superior physical properties of conventional epoxides. The systems based on random copolymers of GMA do not have the controlled placement of the epoxy groups. That is, these copolymers have the epoxy groups distributed randomly along the entire backbone of the methacrylate chain. The placement of the epoxy groups at the end of the polymer chain, as seen in bisphenol A epoxides, imparts important properties such as toughness. The random placement of the epoxy groups lowers final properties.

The bisphenol A-based epoxides are well known and are items of commerce (e.g., the Epon resins from Shell and the family of DER epoxides from Dow). The cyclic epoxides have also been commercially available (e.g. Union Carbide's ERL-4221, a cycloaliphatic diepoxide).

Methacrylate copolymers that use randomly distributed GMA have been used in the coatings industry (U.S. Pat. Nos. 3,817,946; 4,027,066; 3,730,930; 4,346,144). However, no patents or publications have been identified that report ABA triblock methacrylate polymers with GMA in the A segments.

Patents and publications concerning Group Transfer Polymerization (GTP) disclose the ability to make block structures using that process. However, none of these discloses the epoxy triblock structure, nor the advantages of that structure as a durable epoxy resin. For a detailed discussion of GTP see Webster et al., "Group Transfer Polymerization—A New and Versatile Kind of Addition Polymerization", J. Am. Chem. Soc. 105, 5706 (1983); and U.S. Pat. Nos. 4,414,372; 4,417,034; 4,508,880; 4,524,196; 4,581,428; 4,588,795; 4,598,161; 4,605,716; 4,622,372; and 4,656,233; and commonly assigned U.S. patent applications Ser. Nos. 660,588 filed Oct. 18, 1984; 673,926 filed Nov. 21, 1984; and 004,831 filed Jan. 13, 1987. The disclosures of these patents and applications are hereby incorporated by reference. More specifically, these patents and applications disclose processes for polymerizing an acrylic or maleimide monomer to a "living" polymer in the presence of:

(i) an initiator having at least one initiating site and which is a tetracoordinate organo (Si, Sn or Ge) compound, including such compound having at least one oxygen, nitrogen or sulfur atom attached to Si; and (ii) a co-catalyst which is a source of fluoride, bifluoride, cyanide or azide ions or a suitable Lewis acid, Lewis base or selected oxyanion.

The aforesaid patents and applications also disclose capping of "living" silylketene acetal groups with agents containing capping functions such as —CHO, —C(O)—, —NCO, —Br, —Cl and —TiCl$_3$.

In GTP processes, the polymer produced is "living" in that the polymerization is characterized by the presence, in the growing and in the grown polymer, of a moiety containing the aforesaid metal at "living" ends and the activating substituent or diradical, or a tautomer thereof, at "nonliving" ends of the polymer.

Monomers which are useful in GTP are of the formula CH$_2$=C(Y)X wherein:

X is —CN, —CH=CHC(O)X' or —C(O)X';

Y is —H, —CH$_3$, —CN or —CO$_2$R, provided, however, when X is —CH=CHC(O)X', Y is —H or —CH$_3$;

X' is —OSi(R$^1$)$_3$, —R, —OR or —NR'R";

each R$^1$, independently, is H or a hydrocarbyl radical which is an aliphatic, alicyclic, aromatic or mixed aliphatic-aromatic radical containing up to 20 carbon atoms, provided that least one R$^1$ group is not H;

R is a hydrocarbyl radical which is an aliphatic, alicyclic, aromatic or mixed aliphatic-aromatic radical containing up to 20 carbon atoms, or a polymeric radical containing at least 20 carbon atoms, any of said radicals optionally containing one or more ether oxygen atoms within aliphatic segments thereof, optionally containing one or more functional substituents that are unreactive under polymerizing conditions, and optionally containing one or more reactive substituents of the formula —Z'-(O)C—C(Y¹)=CH₂ wherein Y¹ is H or CH₃ and Z' is O or NR'; and each of R' and R" is independently selected from $C_{1-4}$ alkyl, Initiators which are useful in GTP include the silicon-containing initiators of U.S. Pat. Nos. 4,414,372; 4,524,196; 4,417,034; 4,508,880; 4,581,428; and 4,656,233, supra, and application Ser. Nos. 660,588 and 673,926, supra. Initiators which are preferred for use herein are of the formula selected from $(R^1)_3MZ$, $(R^1)_2M(Z^1)_2$ and $O[M(R^1)_2X^1]_2$ wherein:

$R^1$ is as defined above;

Z is an activating substituent selected from the group consisting of

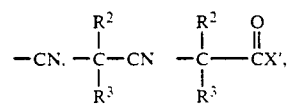

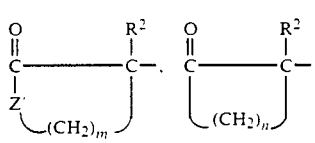

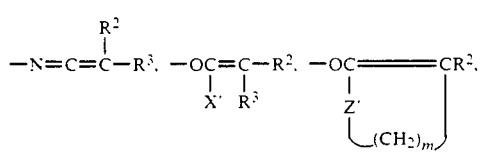

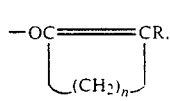

—SR, —OP(NR'R")₂, —OP(OR¹)₂, —OP[OSi(R¹)₃]₂ and mixtures thereof wherein R, R¹, R' R", X' and Z' are as defined above;

$Z^1$ is the activating substituent

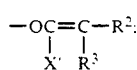

m is 2, 3 or 4;
n is 3, 4 or 5;
M is Si, Sn or Ge, provided, however, when Z is

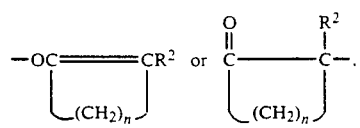

M is Sn or Ge; and
each of $R^2$ and $R^3$ is independently selected from H and hydrocarbyl, defined as for R above;

(a) at least one of any R, $R^2$ and $R^3$ in the initiator optionally containing one or more initiating substituents of the formula $-Z^2-M(R^1)_3$ wherein M and $R^1$ are as defined above;

$Z^2$ is an activating diradical selected from the group consisting of

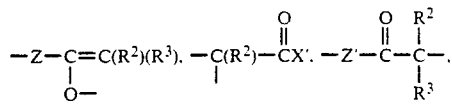

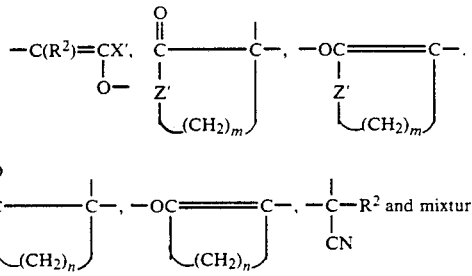

thereof, wherein $R^2$, $R^3$, X', Z', m and n are as defined above provided however when $Z^2$ is

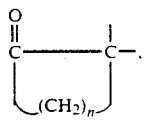

M is Sn or Ge, (b) $R^2$ and $R^3$ taken together are

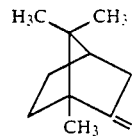

if Z is

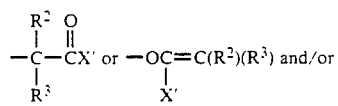

$Z^2$ is $-Z'-\overset{O}{\underset{\|}{C}}-C(R^2)(R^3)-$, and (c) X' and either $R^2$ or $R^3$ taken together are

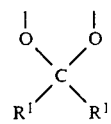

if Z is

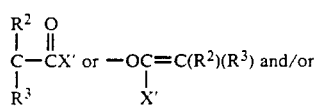

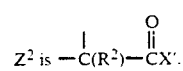

R. A. Olofson and J. Cuomo, Tetrahedron Lett., 21, 819 (1980) disclose fluoride ion catalyzed O-acylation of silyl enol ethers with compounds of the type RXC(O)F where X is O, NR' or a single bond, R is a cyclic or acyclic aliphatic radical and R' is methyl or, together with R, morpholino. C-acylation of silyl enol ethers is not reported.

U.S. Pat. No. 4,482,729 discloses reactions of non-polymeric fluorine-containing silylketene acetals such as $CF_3CH=C(OSi(CH_3)_3)OCH_3$, including reaction with a propionyl chloride, to form the alpha-trifluoromethyl-beta-ketoester $CH_3CH_2C(O)CH(CF_3)CO_2CH_3$. Electron-withdrawing substituents such as —COOR attached to the double bond of silylketene acetals are known to promote reaction with acyl chlorides and anhydrides; —$CF_3$ is strongly electron-withdrawing.

Japanese Patent Application 53/034-719 discloses the preparation of alpha-hydroxysuccinic acid esters by reaction of non-polymeric silylketene acetals with alpha-ketocarboxylic esters in the presence of a Lewis acid catalyst.

E. Colvin, "Silicon in Organic Synthesis", page 234, Butterworths, Boston (1981); and M. W. Rathke and D. F. Sullivan, Tetrahedron Lett., 1297 (1973) show that even with amine promoters, acylation of silylketene acetals (SKA) does not occur with acyl chlorides when the SKA contains two α-substituents. Polymerizing methacrylate chain ends have two such substituents. These references further disclose that a stoichiometric amount of amine is required even when less than two α-substituents are present.

Acylation of non-polymeric silyl enol ethers is well known. For example, R. Noyori et al., Tet., 37, 3899 (1981) disclose the acylation of silyl enol ethers in the presence of trimethylsilyl triflate as the (Lewis acid) catalyst. R. E. Tirpak et al., J. Org. Chem., 47, 5099 (1982) disclose acylation of silyl enol ethers with acyl chlorides in the presence of Lewis acid promoters. E. P. Kramarova et al., J. Gen. Chem. USSR, 43, 1843 (1973); ibid., 45, 469 (1975) disclose C-acylation, usually, of silyl enol ethers by reaction with acyl chlorides or anhydrides; the former require catalytic amounts of mercuric chloride; the latter contain activating alpha-halogen atoms.

G. S. Burlachenko et al., J. Gen. Chem., USSR, 43, 1708 (1973) disclose the reaction of alkyl silylketene acetals with acetyl chloride or triethylsilylacetyl chloride. The reaction produces alkylsilyl derivatives of acetoacetic enol esters, e.g. $CH_3COCl + 2CH_2=C(OCH_3)OSi(C_2H_5)_3 \rightarrow CH_3C(OSi[C_2H_5]_3)=CH-CO_2CH_3$.

A. Wissner, J. Org. Chem., 44(25), 4617 (1979) discloses a similar reaction to that of Burlachenko et al., and further shows that acid-catalyzed hydrolysis of the enol ester provides a beta-ketoester. The reactions of Burlachenko et al., and Wissner require that the silylketene acetal contain an olefinic hydrogen atom, which is released during the reaction as HCl.

G. Rousseau et al., Tetrahedron Lett., 26(35), 4191 (1985) disclose the C-acylation of non-polymeric silylketene acetals with acryloyl and mono-substituted acryloyl chlorides to form beta-ketoesters. The reaction is catalyzed by Lewis acids such as zinc bromide. Mainly, delta-diesters or delta-esteracids are produced without Lewis acid catalysis when alpha,beta-unsaturated acyl chlorides are used, the reaction involving addition to carbon-carbon double bonds, not to carbonyl.

The acylating and sulfonylating agents and silylketene acetals employed in the invention which will be described in greater detail hereinbelow are known or obvious compounds. The polymeric silylketene acetal reactants are "living" polymers prepared by Group Transfer Polymerization, supra.

The invention which will be described in greater detail hereinbelow also is concerned with ABA triblock polymers that have glycidyl methacrylate (GMA) as the A segments and standard (meth)acrylate monomers as the B segment. These methacrylate triblock polymers have now been synthesized with epoxy groups located only at the ends of the polymer chain. Because their backbone is a (meth)acrylate (meaning acrylate and/or methacrylate) structure, these epoxy resins should be significantly more durable than conventional bisphenol A based epoxides. These new polymers should have better final properties than the cyclic epoxides because the backbone is polymeric in nature. They should be better than conventional GMA polymers that have a random distribution of epoxy groups because all of the epoxy groups are now located at the end of the chains, similar to bisphenol A epoxides.

SUMMARY OF THE INVENTION

The invention resides in a process for the preparation of an ABA block copolymer having a center segment between two end segments, each end segment being an oxirane-containing acrylic or methacrylic moiety, said center segment being an acrylic or methacrylic moiety not containing oxirane groups, by reacting the ingredients by Group Transfer Polymerization (GTP) techniques.

The invention also is concerned with the preparation of ABA triblock polymers that have glycidyl (meth)acrylate (GMA or GA) as the A segments and standard (meth)acrylate monomers as the B segment. These methacrylate triblock polymers have now been synthesized with epoxy groups located only at the ends of the polymer chain. Because their backbone is a (meth)acrylate structure, these epoxy resins should be significantly more durable than conventional bisphenol A based epoxides. These new polymers should have better final properties than the cyclic epoxides because the backbone is polymeric in nature. They should be better than conventional GMA polymers that have a random distribution of epoxy groups because all of the epoxy groups are now located at the end of the chains, similar to bisphenol A epoxides.

The invention still further resides in a process for preparing beta-ketoesters or beta-sulfonylesters, the process comprising contacting and reacting a silylketene acetal with a selected acyl or sulfonyl compound in the presence of a catalyst which is a source of a selected anion or oxyanion. The silylketene acetal is of the formula

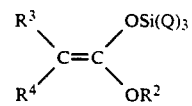

wherein:
each Q, independently, is selected from —$R^1$, —$OR^1$, —$N(R^1)_2$ and —$SR^1$;

each $R^1$, independently, is a hydrocarbyl or substituted hydrocarbyl radical;

$R^3$ is H, hydrocarbyl or substituted hydrocarbyl;

each $R^2$ and $R^4$, independently, is hydrocarbyl, substituted hydrocarbyl, or a polymeric radical. The acyl or sulfonyl compound is selected from $[XC(O)]_nR^5$ and $[YS(O)_2]_nR^5$ wherein:

X is a silicon activating group;

Y is —F or —OAr;

Ar is aryl or substituted aryl;

$R^5$ is a hydrocarbyl, substituted hydrocarbyl or polymeric radical, of valence n, wherein the carbon atom adjacent to the C(O) or S(O)$_2$ is not part of a carbon-carbon double or triple bond; and n is an integer of at least 1.

The invention also resides in the beta-ketoester and beta-sulfonylester having the formulas $[R^2O_2C—C(R^3)(R^8)—C(O)]_aR^5[C(O)X]_{n-a}$ and $[R^2O_2C—C(R^3)(R^8)—S(O)_2]_aR^5[S(O)_2Y]_{n-a}$, respectively, wherein:

$R^2$ is a hydrocarbyl, substituted hydrocarbyl, or a polymeric radical;

$R^3$ is H, hydrocarbyl or substituted hydrocarbyl;

$R^5$ is a hydrocarbyl, substituted hydrocarbyl or polymeric radical, of valence n, wherein the carbon atom adjacent to the C(O) or S(O)$_2$ is not part of a carbon-carbon double or triple bond;

$R^8$ is a polymeric radical comprised of acrylic monomer units, preferably methacrylic units;

X is a silicon activating group;

Y is —F or —OAr;

Ar is aryl or substituted aryl;

n is an integer or at least 1; and a is an integer of at least 1 but not greater than n.

Still further, the invention also resides in block and chain-extended polymers prepared from the above-formulated products.

DETAILED DESCRIPTION OF THE INVENTION

There are at least four major approaches to making ABA polymers according to the invention. They are: (1) start with a monofunctional initiator and polymerize in three steps, GMA first, which makes the first A segment, followed by methyl methacrylate (MMA) which adds onto the A segment and makes an AB polymer, and finally GMA again which completes the ABA structure; (2) start with a difunctional initiator and polymerize the monomers in two steps, MMA first, which creates the middle B segment, followed by GMA which will add onto both ends simultaneously because of the difunctional initiator, making the ABA polymer; (3) start with monofunctional initiator, polymerize in two steps, GMA first, making the A segment, followed by MMA, making an AB polymer, and finally coupling the polymer to unite the two AB polymers at the B end and create an ABA polymer; (4) start with an epoxy containing initiator, the A segment, polymerize the MMA, making an AB polymer, and finally, couple the polymer which unites the two AB polymers at the B end and creates an ABA polymer.

Monomers which can be used to prepare the center section include, for example, alkyl methacrylates and acrylates that can be used to prepare acrylic polymers. Included are methyl methacrylate, ethyl methacrylate, butyl methacrylate (BMA), hexyl methacrylate, 2-ethylhexyl methacrylate, nonyl methacrylate, lauryl methacrylate, stearyl methacrylate, cyclohexyl methacrylate, isodecyl methacrylate, propyl methacrylate, phenyl methacrylate, isobornyl methacrylate, ethyl acrylate, propyl acrylate, isopropyl acrylate, butyl acrylate, isobutyl acrylate, hexyl acrylate, 2-ethylhexyl acrylate, nonyl acrylate, lauryl acrylate, stearyl acrylate, cyclohexyl acrylate, isodecyl acrylate, phenyl acrylate, isobornyl acrylate, blocked (meth)acrylic acid monomers which can be unblocked after polymerization, including trimethyl silyl methacrylate and 1-butoxyethyl methacrylate, and the like. Both the end and center sections can include other functionality, such as for crosslinking, so long as it does not interfere with polymerization.

Example 1 describes (3), supra, how one might make GMA//BMA//GMA using monofunctional initiator, two monomer feeds, and a coupling agent. Example 2 describes (4), supra, how one might make GMA//BMA//GMA using an epoxy initiator, a monomer feed, and a coupling agent. The coupling agent is preferably diphenyl terephthalate, but it could be other suitable materials.

Following are definitions of terms used in the Summary of the Invention, supra. By "acyl" is meant the moiety which remains after removal of a hydroxy group from an organic carboxylic acid. By "sulfonyl" is meant the moiety which remains after removal of a hydroxy group from an organic sulfonic acid.

By "hydrocarbyl radical" is meant a radical consisting essentially of hydrogen and up to about 20 carbon atoms. By "substituted hydrocarbyl radical" is meant hydrocarbyl which contains one or more functional substituents that are inert under reaction conditions and/or one or more ether oxygen atoms within aliphatic segments thereof.

By "polymeric radical" is meant a polymeric radical containing more than 20 carbon atoms; the radical may contain the intra-chain heteroatoms O, N or S and/or non-functional or functional substituents that are inert under reaction conditions.

By "aryl" is meant an aromatic radical having at least six carbon atoms. By "substituted aryl" is meant aryl which contains one or more aliphatic substituents or functional substituents that are inert under reaction conditions.

By "a selected anion or oxyanion" is meant a fluoride, difluorotrimethylsilicate, bifluoride, cyanide or azide anion, or an oxyanion which forms a conjugated acid having a pKa (DMSO) of about 5 to about 24, preferably about 6 to about 21, more preferably 8 to 18 as defined in U.S. Pat. No. 4,588,795, column 5, lines 15–18. By conjugated acid is meant the acid formed by protonating the catalytic oxyanion. By pKa (DMSO) of the conjugate acid is meant the negative logarithm of the acidity constant of the conjugated acid, measured in dimethylsulfoxide at 25° C. (U.S. Pat. No. 4,588,795, column 5, lines 24–30). The catalysts which are sources of a selected anion or oxyanion also include the Group Transfer Polymerization catalysts described in the aforesaid GTP patents and applications, especially in U.S. Pat. Nos. 4,508,880 and 4,588,795, which are incorporated herein by reference. Representative examples of the catalysts which are sources of a selected oxyanion in '795 are given in Col. 6, line 52 to Col. 7, line 6. The catalysts which are sources of a selected anion in '880, at Col. 11, lines 45–54, in part, include: tris(dimethylamino)sulfonium difluorotrimethylsilicate, tris(dimethylamino)sulfonium cyanide, tetraphenylarsonium cyanide, tris(dimethylamino)sulfonium azide, tetraethylammonium azide, alkali metal fluorides, alkali metal cyanides, alkali metal azides, tris(dimethylamino)-sulfonium difluorotriphenylstannate, tetrabutylammonium fluoride, tetramethylammonium fluoride, and tetraethylammonium cyanide. Lewis acids are not catalysts for the present process.

It is believed that the selected anion or oxyanion of the catalyst starts the reaction by associating with and activating the silicon of part of the silylketene acetal. As a result of this activation, it is believed, the silylketene acetal reacts with the sulfonyl or acyl compound generating free group Y (—F or —OAr) or "silicon activating group" X. It is believed that groups X or Y sustain the reaction by further associating with and activating silicon on the remaining, as yet unreacted, part of the silylketene acetal.

By "silicon activating group" (X) is meant a leaving group which is capable of displacing silicon from the silylketene acetal under reaction conditions. It is believed that free X is generated during the reaction and sustains the reaction in the manner described above. Because suitable silicon activating groups, which include —F, —OAr or —OC(O)$R^6$, sustain the reaction, as described, they reduce the amount of added catalyst required for the reaction. In the above formula $R^6$ is hydrocarbyl or substituted hydrocarbyl.

By "leaving group" is meant a group which can be released from the acyl compound. The term "leaving group" is described in J. March, "Advanced Organic Chemistry: Reactions, Mechanisms and Structure", McGraw-Hill, New York (1968), pp. 199-200. It is exemplified in that reference for alkyl compounds on pp. 251-252 and for acyl compounds on pp. 274-275, in particular with reference to the group "X" in equations 1 and 2 at the top of page 275.

The following preferred embodiments are within the scope of the invention as described in the Summary of the Invention, supra.

Preferred silylketene acetals which are useful herein are those wherein:

Q is —$R^1$, and $R^1$ is $C_{1-8}$ alkyl or aryl, most preferably methyl;

$R^2$ is $C_{1-8}$ hydrocarbyl;

$R^3$ is methyl; and $R^4$ is a polymeric radical, more preferably a substituted polymeric radical; still more preferably the substituent is ester or protected hydroxyl; preferably the polymeric radical is comprised of acrylic monomer units, most preferably methyl methacrylate units.

Most preferred silylketene acetals are "living" acrylic polymers prepared by Group Transfer Polymerization (GTP).

Preferred acyl compounds are those of the formula $[XC(O)]_nR^5$ wherein:

X is —F, —OAr or —OC(O)$R^6$ wherein Ar is phenyl or substituted phenyl, and $R^6$ is $C_{1-8}$ alkyl, aryl or substituted aryl;

$R^5$ is $C_{1-8}$ hydrocarbyl; and n is 1 or 2; most preferably 2;

Preferred catalysts are sources of fluoride, bifluoride or selected oxyanions; bi-oxyanions, especially biacetate, are most preferred.

The beta-ketoester or beta-sulfonylester products of the invention process are of the formulas $[R^2O_2C-C(R^3)(R^4)-C(O)]_aR^5[C(O)X]_{n-a}$ and $[R^2O_2C-C(R^3)(R^4)-S(O)_2]_aR^5[S(O)_2Y]_{n-a}$, respectively, wherein the symbols are defined as above; preferably a is 1 or 2. The ketoester or sulfonylester products wherein $R^4$ is limited to $R^8$, defined above as a polymer radical comprised of acrylic monomer units, are believed to be novel.

It is to be understood that, in the fully converted ketoester or sulfonylester products of a stoichiometric reaction between the acyl or sulfonyl compound and SKA, a is essentially equal to n. Products prepared by employing a stoichiometric excess of acyl or sulfonyl compound will contain —C(O)X or —S(O)$_2$Y groups (n>a), provided n is at least 2. These groups are then available for subsequent reaction with other, different, silylketene acetals and/or with other reagents, as discussed hereinafter.

Silylketene acetals are "capped", "coupled", or branched, or combinations thereof, by reaction with acyl or sulfonyl compounds according to the invention Process, depending on the magnitude of n, and on the molar ratios of the reactants employed, as discussed hereinafter. Especially preferred polymers can be prepared by coupling protected hydroxyl-functional Polymeric silylketene acetals (SKA) by means of diacyl compounds wherein n is 2, or by capping polymeric SKA with monoacyl compounds wherein n is 1.

Substituents that are, in most cases, unreactive under reaction conditions include, but are not limited to, —$CO_2R$, —OC(O)R, —N($R^1$)$_2$, —C(O)N($R^1$)$_2$, —CN, —CH=$CH_2$ provided such groups are not conjugated with carbonyl or cyano groups, —P(O)(O$R^1$)$_2$, —C(O)$R^1$, and —OH and —$CO_2H$ if chemically protected. In these substituents R is hydrocarbyl other than aryl and $R^1$ is defined as above.

As indicated above, most preferred SKA are "living" acrylic polymers prepared by Group Transfer Polymerization, as described in the foregoing patents and applications, the disclosures of which have been incorporated herein by reference. Particularly useful polymeric SKA of this type also contain terminal silyl ether groups at non-living ends; these groups are introduced, e.g., by use of an appropriate GTP initiator containing at least one SKA moiety of the formula >C=C(OSi[Q]$_3$)(O$R^2$) wherein Q and $R^2$ are defined as above, the $R^2$ group containing a trialkylsiloxy group. In the polymerization process, this group becomes located at a non-living end of the polymer chain. An example of such an initiator is [(2-methyl-1-[2-(trimethylsiloxy)ethoxy]-1-propenyl)oxy]trimethylsilane (TTEB).

In the invention process, a solvent is desirable but is not essential unless neither reactant is a liquid. Suitable solvents are those described in the aforesaid GTP patents and applications; aprotic liquids such as tetrahydrofuran (THF), toluene, benzene and the glymes are Preferred. Solvent mixtures may be especially suitable. Total reactant concentration should be at least about 1% (w/v), preferably in the range 5-60% (w/v).

The process of the invention is carried out at a temperature of about −100° C. to +150° C., preferably about −15° C. to about 80° C., most preferably 10° to 60° C.

Silylketene acetal concentration can vary from about 0.1% to 100% to 100% (w/w). Polymeric SKA which are viscous liquids or solids can be used at concentrations of about 25-80% (w/w), depending on molecular weight.

The acyl or sulfonyl compound can be used at a concentration such that the molar ratio of acyl or sulfonyl compound to SKA is about 0.01 to about 100, preferably about 0.25 to about 10, more preferably about 0.5 to about 5. Catalyst concentration can be about 0.0001 to about 50 mol % of the SKA present, preferably about 0.001 to about 10 mol %.

As already indicated, the invention process leads to capping and/or coupling of SKA molecules, depending on functionality and concentration of acylating or sulfonating compound employed. In general, to cap an SKA, a monofunctional (n is 1) acylating or sulfonating compound is employed at a molar ratio to SKA of at least 1:1. For coupling, a polyfunctional (n is 2 or more) acylating or sulfonating compound is employed at a molar ratio to SKA of not more than 1:2. A mixture of capped and coupled SKA products can be produced by employing a mixture of mono- and polyfunctional acylating or sulfonating compounds.

Preferred telechelic polymers are prepared in the present invention process by coupling a polymeric SKA containing a suitable functional group, such as a protected hydroxyl, e.g. trialkylsiloxy, as described above, using a difunctional acyl or sulfonyl compound in the molar ratio to SKA of about 1:2 in the presence of catalyst. The Polymer product contains approximately two trialkylsiloxy groups per molecule; these can be converted to hydroxyl by hydrolysis with, e.g. hydrochloric acid in methanol. The telechelic polymer is recovered by precipitation in non-solvent.

The telechelic polymer prepared by SKA coupling, as described above but with difunctional compound in slight molar excess of 1:2 can, before precipitation, be "finished" to give more precisely two terminal functions per molecule by following the above acylation-coupling procedure with the addition of a stoichiometric excess of a —C(O)X or —S(O)$_2$Y reactive compound such as ethylene glycol, to convert residual —C(O)X or —S(O)$_2$Y polymer end groups to OH, together with an organic base such as an amine to consume by-product HX or HY, thus driving the reaction to completion.

—C(O)X or —S(O)$_2$Y ends introduced by capping a SKA with a stoichiometric excess of di- or Polyfunctional acylating compound can also be used to provide other functional end groups, e.g., OH, CO$_2$H, SH and NH$_2$, for later use in chain extension or coupling, by subsequent reaction of —C(O)X or —S(O)$_2$Y ends with appropriate reagents such as glycols water, dimercaptans, aminoalcohols and diamines. —C(O)X or —S(O)$_2$Y end groups can also be reacted ("finished") by use of monofunctional reagents containing the above functions. Such reactions will be well known to those skilled in the art.

Telechelic polymers can also be prepared by a combination of coupling and finishing wherein the SKA is reacted with slightly more than 0.5 mole of difunctional acylating compound per mole of SKA. —C(O)X or —S(O)$_2$Y groups present in the product are then finished as described above. If only —C(O)X groups are required, with minimal coupling, the SKA can be reacted with a large excess of acylating agent, followed by sufficient finishing agent to react all —C(O)X ends plus residual acylating compound. In general, such reactions are preferably carried out in solution.

The process of the invention is believed to proceed according to the following illustrative equation:

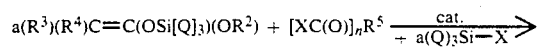

-continued $$[(R^3)(R^4)\underset{|}{C}-C(O)]_aR^5[C(O)X]_{n-a}$$
$$C(O)(OR^2)$$

It will be understood that the (n-a) residual —C(O)X (or —S(O)$_2$X) moieties can react with other SKA molecules in the presence of catalyst, or with other reactants as discussed above.

In the following examples of the invention Process, and in comparative experiments, parts and percentages are by weight and temperatures are in degrees Celsius unless otherwise specified.

EXAMPLE 1

(GMA//MMA//GMA 4//40//4)

Mono-Initiator, 2-Feed, Coupling Agent

A 250 ml round bottom flask, equipped with a mechanical stirrer, thermometer, and nitrogen inlet, is charged with dimethoxyethane - glyme - (18.6 g), 1-trimethylsiloxy-1-i-butoxy-2-methylpropene (2.1 g, 0.0097 mole), and glycidyl methacrylate (5.6 g, 0.0394 mole). The flask is cooled to 10° C. Tetrabutylammonium m-chlorobenzoate TBACB (200 μl of a 1.0M solution in acetonitrile) is injected into the flask. Feed I consists of glyme (3.0 g) and tetrabutylammonium m-chlorobenzoate (200 μl of a 1.0M solution). It is started 10 minutes after the first injection of TBACB. It is added over 56 minutes. Feed II is methyl methacrylate (20.0 g, 0.20 mole). It is started simultaneously with the start of the feed I. Feed II is added over 35 minutes. Twenty minutes after feed II is completed, diphenyl terephthalate (1.54 g, 0.0048 mole) is added and the reaction is allowed to remain at room temperature overnight. This couples living polymer chains together. Then methanol (4.0 g) is added. This should be an ABA block polymer (GMA//MMA//GMA 4//40//4) with 4 epoxy groups on each end of the polymer chains.

EXAMPLE 2

(GMA//MMA//GMA 1//40//1)

Epoxy Initiator, 1-Feed, Coupling Agent

A 250 ml round bottom flask, equipped with a mechanical stirrer, thermometer, and nitrogen inlet, is charged with tetrahydrofuran (18.6 g, and 1-trimethylsiloxy-1-glycidoxy-2-methylpropene (2.16 g, 0.010 mole). The flask is cooled to 10° C. Tetrabutylammonium m-chlorobenzoate 100 μl of a 1.0M solution in acetonitrile) is injected into the flask. Feed I consists of tetrahydrofuran (4.0 g) and tetrabutylammonium m-chlorobenzoate (100 μl of a 1.0M solution in acetonitrile). It is started 10 minutes after the first injection of TBACB. Feed II is methyl methacrylate (20.0 g, 0.20 mole). It is started simultaneously with Feed I and is added over 30 minutes. Twenty minutes after Feed II is completed, diphenyl terephthalate (1.08 g, 0.005 mole) is added and the reaction is allowed to remain at room temperature overnight. This couples the living polymer chains together. This should be an ABA block polymer (GMA//MMA//GMA 1//40//1) with one epoxy group on each end of every polymer chain.

The following discussion is relevant to Examples 3 to 18 which are provided hereinbelow.

$$a(R^3)(R^4)C=C(OSi[Q]_3)(OR^2) + [XC(O)]_nR^5 \xrightarrow[+ a(Q)_3Si-X]{cat.}$$

Drying of Equipment and Gases

All glassware, including syringes, and syringe needles were dried in a 165° C. oven overnight prior to use. Rubber septa, Teflon parts, and other polymeric materials were dried overnight in a vacuum oven at 65° C., with a slight nitrogen purge. Argon (Air Products) was purified by passage through a molecular sieve trap for drying and a reduced Girdler G-33 nickel oxide catalyst trap from United Catalyst, Inc., for removal of oxygen.

Glassware was assembled while hot, flushed with argon with additional external heating, and then maintained at room temperature (RT) under a slightly positive pressure of argon. The joints of the glassware were connected without grease and wrapped with Parafilm ®M laboratory film. Serum caps, for syringe introduction of solvents and reagents, were secured onto openings in the glassware by tightly-wrapped nylon ties.

Chemicals

Methyl methacrylate (MMA, Aldrich Chemical Co.) was purified and dried by passage through a column of anhydrous alumina, neutral grade (Woelm), exiting the column through a syringe needle into a serum-capped bottle kept under a slightly Positive pressure of argon. Tetrahydrofuran (THF) was dried over sodium and distilled from sodium benzophenone ketyl immediately before use. Acetonitrile was dried by distillation from $P_2O_5$. Initiators were distilled in a 12-inch spinning band column. Dried solvents, initiators, and catalyst solutions were stored in "Aldrich" bottles in drierite-packed desiccators.

Analysis $^1$H-NMR spectra were recorded with a Nicolet 360WB spectrometer. Molecular weights were determined by gel permeation chromatography (GPC) using a Waters Associates GPC with a 590 pump, 401 R.I. detector and 4 Microstyrogel columns, 100,000, 10,000, 500, and 100. Polydispersity (D) is given by the formula D=Mw/Mn where Mw and Mn are, respectively, weight and number average molecular weight. Hydroxy-PMMA and a,ω-dihydroxy-PMMA content of the product was determined by high pressure liquid chromatography, employing a Du Pont Instruments Series 800 Gradient Controller and Chromatographic Pump and a Waters Associates R401 refractive index detector.

EXAMPLE 3

Reaction of Benzoyl Fluoride and [(1-methoxy-2-methyl-1-propenyl)oxy]trimethylsilane (MTS)

A 100-ml 3-neck r.b. flask was outfitted with a magnetic stirring bar, argon inlet adapter, serum cap, and thermowell. The apparatus was dried as usual and maintained under a slight positive pressure of argon. To the flask were added dry THF 30 ml), MTS (1.6 ml, 8.0 mmol), benzoyl fluoride (0.87 ml, 8.0 mmol, Aldrich, 99% pure), and, last, 0.5M tetrabutylammonium biacetate $Bu_4NOAc.HOAc)/CH_3CN$ (40 μl, 0.25 mol % of MTS). Within one minute, the temperature rose from 25° C. to 36° C., then receded. Stirring was continued for 2 h, and then the solvent and volatile silyl fluoride by-product were removed with a rotary evaporator. The liquid product was dissolved in deuterochloroform ($CDCl_3$) for proton nmr analysis, which showed it to be virtually pure methyl 2-benzoylisobutyrate. NMR ($CDCl_3$, % ppm): 1.5 (s, 6.0 H, $CH_3$), 3.6 (s, 2.9 H, $CH_3O$), and 7.4, 7.5 and 7.8 (m, 5.1 H, $C_6H_5$).

EXAMPLE 4

Reaction of Acetyl Fluoride and MTS

The reaction described in Example 3 was repeated except that acetyl fluoride (Aldrich) was used in place of benzoyl fluoride and 1M tris(dimethylamino)sulfonium bifluoride ($TASHF_2$)/$CH_3CN$ (40 μl, 0.5 mol %) in place of biacetate. The acetyl fluoride was delivered from a cylinder into 15 ml of THF in a serum-capped Erlenmeyer flask. The amount of acid fluoride was measured by difference in weight, and thereby its concentration in solution determined. Thus, 1.37 g of reagent was added to the THF, which required 5.9 ml of solution to be syringed into the reaction flask in order to deliver 0.50 g of acetyl fluoride (8.0 mmol).

The nmr of the liquid product showed it to be virtually pure methyl 2-acetylisobutyrate. NMR ($CDCl_3$, δppm): 1.3 (s, 6.0 H, $CH_3$), 2.1 (s, 3.3 H, $CH_3CO$), and 3.65 (s, 3.0 H, $CH_3O$).

EXAMPLE 5

Benzoyl Fluoride Capping of Polymeric SKA

Methyl methacrylate 25 ml) was polymerized by Group Transfer polymerization (GTP) in a 250-ml, 4-neck r.b. flask, equipped with an argon inlet, thermocouple well, serum cap, and magnetic stirring bar, charged with dry THF (75 ml), [(2-methyl-1-[2-(trimethylsiloxy)ethoxy]-1-propenyl)oxy]trimethylsilane (TTEB) (2.5 ml, 7.9 mmol), 0.5M $Bu_4NOAc.$-$HOAc/CH_3CN$ (8 μl, 0.051 mol % of TTEB). The MMA was added by syringe pump at 0.5 ml/min only after an incubation period of 20 min. Upon addition of MMA, the temperature rose from 24.2° C. to 39.4° C. in 36 min (18 ml MMA added) and declined slowly thereafter to 38.8° C.

The polymer solution was stirred for 1 h, and benzoyl fluoride (1.7 ml, 15.6 mmol, Aldrich, 99% pure) was syringed in. The temperature rose only from 24.5° C. to 24.8° C., so an additional 30 μl of biacetate catalyst was added (net catalyst=0.24% of TTEB-derived living ends). Within 3 min, the temperature rose to 25.7° C., then declined very slowly thereafter, falling to 24.7° C. 45 min after addition of the last measure of catalyst (55 min after benzoyl fluoride addition). The reaction was left unstirred overnight, concentrated to dryness on a rotary evaporator, dissolved in about 50 ml of $CH_2Cl_2$, and precipitated in a large excess of stirred (magnetic bar) hexane (hexane:solution=10:1, v/v).

The precipitate was filtered on a vacuum filter funnel, rinsed three times with hexane, partially dried on the funnel, and dried overnight in an evaporating dish in a fume hood. A sample was dissolved in $CDCl_3$ for proton nmr analysis, the remainder dried for 24 h at 65° C. in a vacuum oven, to constant weight. The dry sample was weighed and a Portion dissolved in THF for GPC analysis.

The weight of recovered poly(methyl methacrylate) (PMMA) was 21.08 g, the calculated TTEB residue 1.7 g. The MMA conversion was thus 83.7%, theor. Mn (100% basis) was 3260. GPC analysis gave Mn=2840, Mw=3100, Mw/Mn=1.09. Duplicate VPO (THF) gave Mn=3200. Compared with the theoretical MMA-/end-group value of 29.4, nmr gave 34.4 (MeO/PhCO)

and 37.2 (MeO/Me₃SiO). The MMA/benzoyl-capped end ratio was calculated from Proton nmr spectra, by comparing peak areas for the MMA resonance at $\delta 3.55$ Ppm (MeO) and benzoyl resonance at $\delta 7.2$–$7.7$ ppm (Ph). As an internal check, the MMA/initiator fragment ratio was also calculated from $\delta 3.55$ ppm (MeO) and the initiator fragment's $\delta 0.1$ (Me₃SiO) peaks.

EXAMPLE 6

Acetyl Fluoride Capping of Polymeric SKA

The procedure of the previous example was repeated except that 1.7 g (27.4 mmol) of acetyl fluoride dissolved in about 17 mL of THF was used in place of benzoyl fluoride. The acetyl fluoride caused a temperature rise from 25.1° C. to 25.7° C. After 10 min, the temperature began to decrease, and 30 $\mu$l of biacetate was added. The temperature rose to a peak of 26.7° C. in another 3 min. The recovered PMMA weighed 23.81 g, a conversion of 96.7%. Theor. Mn (100%) was 3200. GPC gave Mn=2660, Mw=2890, Mw/Mn=1.09. Compared with the theoretical MMA/end-group value of 29.4, nmr gave ca. 27 (MeO/CH₃CO) and 27.5 (MeO/Me₃SiO). The monomer/end-group ratio was calculated from nmr resonances for MMA at $\delta 3.55$ (MeO), acetyl cap at $\delta 2.05$ (overlapping slightly with polymer resonances), and initiator fragment at $\delta 0.1$ (Me₃SiO).

EXAMPLE 7

Phenyl Benzoate Capping of Polymeric SKA

The Procedure of Example 5 was repeated with the following changes: MMA was polymerized using 50 $\mu$l of 0.045M Bu₄NOAc.HOAc/THF, all of which was added at the start. MMA was fed in over a 55-min period, from a pressure-equalizing dropping funnel instead of a syringe pump. The polymer solution was stirred thereafter for 4 h and then capped by a solution of 3.1 g phenyl benzoate 15.6 mmol) in 25 ml of very dry THF, transferred by cannula. The temperature rose very little and more catalyst was added (100 $\mu$l of 0.045M Bu₄.NOAc.HOAc/THF and 100 $\mu$l of 0.2M Bu₄NOAc.-HOAc/CH₃CN). The temperature rose 0.5° C. and the solution slowly acquired a slight yellow color.

Total recovered PMMA was 25.0 g a 93.3% MMA conversion. Theor. Mn was 3260 and GPC gave Mn=2800, Mw=3200, Mw/Mn=1.14. The theoretical MMA/end-group ratio was 29.4 (100% conversion basis) and nmr on polymer purified by re-precipitation gave 41.3 for MMA/capping fragment (MeO/Ph) and 35.6 for MMA/initiator fragment (MeO/Me₃SiO).

EXAMPLE 8

Benzoic Anhydride Capping of Polymeric SKA

The procedure described in Example 5 was repeated with the following changes: MMA was polymerized using 35 $\mu$l of 0.04M Bu₄NOAc.HOAc.6 H₂O/THF and MMA was fed in over a 65 min period, from a pressure-equaliziing dropping funnel. The polymer solution was stirred thereafter for 2½ hours and then capped by a solution of 3.6 g benzoic anhydride (15.9 mmol) dissolved in 10 ml of very dry THF and transferred by cannula. After 200 $\mu$l catalyst was added, the temperature rose 2.3° C. The recovered PMMA, 32.6 g, was dried only at room temperature (RT), then dissolved in 70 ml ethyl acetate and mixed with 2.3 g KOH in 70 ml deionized water, to remove unreacted benzoic anhydride. After vigorous stirring for 30 min., the mixture was shaken in a separatory funnel and the aqueous phase removed. The ethyl acetate layer was extracted with three 70-ml portions of deionized water, dried 2 h over anhydrous MgSO₄ and filtered. The filtrate was poured into well-stirred hexane to precipitate the polymer. The polymer was dried only at RT and after 3 days weighed 26.7 g.

Theor. Mn (100% basis) was 3300 and GPC gave Mn=2900, Mn=3400, Mw/Mn=1.15. The theoretical MMA/end-group ratio was 29.4 and nmr gave 32.7 for MMA/capping fragment (MeO/Ph) and 66.8 for MMA/initiator fragment (MeO/Me₃SiO); the high latter value arose from hydrolytic loss of Me₃Si end groups caused by KOH treatment.

EXPERIMENT 1

Attempted Capping for Polymeric SKA with Benzoyl Chloride

The procedure of Example 5 was repeated except for the replacement of benzoyl fluoride by 1.8 ml benzoyl chloride 2.2 g, 15.5 mmol). The temperature rose from 27.4° to 27.6° C,. when the chloride was added, but did not rise further upon addition of 30 $\mu$l of biacetate catalyst solution. The recovered PMMA weighed 23.8 g, a 95.4% conversion of MMA. Theor. Mn (100% basis) was 3260 and GPC gave Mn=2580, Mw=2900, Mw/Mn=1.12. NMR analysis showed no resonance for a benzoyl cap at $\delta 7.2$–$7.7$, indicating that acid chloride, which is usually more reactive than acid fluoride, failed to react with SKA.

EXAMPLE 9

Coupling of Polymeric SKA with Terephthaloyl Fluoride (TF₂)

A. Preparation of terephthaloyl fluoride

A 250-ml r.b. flask, fitted with magnetic stirring bar, serum cap, reflux condenser and argon inlet tube, was flushed with argon and then loaded with:

anhydrous KF (Aldrich, 35.0 g, 0.602 mol);
terephthaloyl chloride (Aldrich, 97%, 24.6 g, 0.118 mol);
a solution of 18-Crown-6 (Aldrich, 99%, 3.0 g, 0.011 mol), in CH₂Cl₂ (Fisher, reagent grade, 60 ml), prepared in a bottle in the dry box.

When the mixture was stirred, it began to reflux. It was maintained at reflux for two hours and stirred at RT for 1 h, under slight argon pressure.

The KF/KCl residue was removed by vacuum filtering the solution under nitrogen and rinsing the residue three times with 50-ml Portions of CH₂Cl₂, also under nitrogen. The solvent was removed from the filtrate on a rotary evaporator with house vacuum. The solid was sublimed three times, under strong vacuum, at 100° C. The sublimer was assembled and disassembled in a glove bag, under nitrogen. The product from the respective sublimations was weighed and its m.p. measured: 20.5 g (90°–108° C.), 20.0 g (115°–123° C.), and 18.1 g (115°–124° C.).

The product from the third sublimation was recrystallized overnight from 70 ml dry toluene/150 ml petroleum ether. The mother liquor was removed from the solid by transferring it via a cannula to a serum-capped flask, under argon. The solid was rinsed five times with 50-ml portions of 1:2.2 toluene-petroleum ether, the rinsings removed each time by cannula transfer to the mother liquor. The solid was blown dry by a nitrogen sweep through the flask used for the recrystallization.

A second crop was taken by concentrating the combined mother liquor plus rinsings with a nitrogen sweep applied to the heated liquid. The volume of the concentrate was tripled by the addition of petroleum ether, and the solution allowed to cool to RT and then set aside for 3 days. The product/solvent mixture was chilled 1 h in ice water and the mother liquor transferred away by cannula. The solid was rinsed at RT with four 30-ml portions of Petroleum ether and dried as above. The crops were weighed and portions placed in melting point tubes, in a dry box.

1st crop: m.p. 122°–123.5° C., 11.6 g
2nd crop: m.p. 121°–123.5° C., 2.6 g
The combined yield was 14.2 g, 71% of theory (20.0 g).

B. Preparation of α,Ω-Dihydroxy-PMMA

Methyl methacrylate was polymerized as follows:

A 250-ml 4-neck r.b. flask was outfitted with a magnetic stirring bar, pressure-equalizing dropping funnel, thermowell (for thermocouple), and argon inlet tube. After being heated with a heat-gun under argon flush, the apparatus was allowed to cool to RT and kept under a slight argon pressure.

The flask was charged with:
THF (distilled from sodium benzophenone ketyl) ... 75 ml
TTEB ... 5.0 ml (15.7 mmol) 0.041M Bu$_4$NOAc.-HOAc.6H$_2$O in THF ... 25 μl The mixture was stirred and 25 ml MMA was dripped in over a 50 min period, from the dropping funnel. Additional biacetate solution (25 μl) was added 30 min into the monomer addition. The mixture was stirred for an additional 4½ h to complete polymerization (polymeric SKA) prior to the coupling reaction.

A solution of terephthaloyl fluoride (1.34 g, 7.88 mmol), prepared in Part A, in still-dried THF (10 ml) was cannula-transferred to the polymeric SKA prepared above and a 0.1° C. temperature rise was observed.

Biacetate catalyst solution (200 μl) was added to the stirred mixture and a 3.5° C. temperature rise observed over the next 13 minutes. The reaction was left to stir an additional 1 h, then left unstirred at RT for 16 h. The solution slowly yellowed. An aliquot of the α,Ω-di(-trimethylsiloxy)-PMMA product was removed and precipitated in a 20-fold excess of hexane in a stirred beaker—sample A.

The remaining solution was treated with 6.0 ml of 10% (w/w) HCl-MeOH and stirred for 3 h at RT to hydrolyze trimethylsiloxy end groups. The solution became colorless. The solution was concentrated and polymer Precipitated when it was poured slowly into a 20-fold excess of hexane, rapidly stirred in a large beaker—sample B. Recovered weights (excluding 0.3 g remaining on glassware)—A: 1.4 g; B: 24.2 g dried 32 h/65° C./vac oven).

Overall MMA conversion was 93.2%.
GPC analysis:
A- Theor. Mn (100% conversion and 100% coupled)=3500. Mn=3400, Mw=4000, Mw/Mn=1.19;
B- Theor. Mn (100% basis)=3300. Mn=3300, Mw=4000, Mw/Mn=1.19;
HPLC Analysis:
B- PMMA-OH 7.3% and HO-PMMA-OH 92.7;
NMR Analysis:
A- Theoretical MMA/end-group=d.p. before coupling=14.7;

Theoretical MMA/coupling agent (assuming 100% coupling)=2×d.p. before coupling=29.4
Actual MMA/end-group (from MeO at δ3.55 and initiator Me$_3$SiO fragment at δ0.1)=15.7.
Actual MMA/coupling agent (from MeO at δ 3.55 and C$_6$H$_4$ at δ7.65)=33.0.

All three analyses demonstrate a high level of coupling.

EXAMPLE 10

Coupling of Polymeric SKA with Terephthaloyl Fluoride

The procedure of Example 9B was repeated but without adding more biacetate catalyst during coupling. The temperature rose only 0.3° C. during coupling. Recovered PMMA (dried 48 h is 65° C. vacuum oven) weighed as follows excluding 0.3 g remaining on glassware): A- 1.2 g, B- 24.8 g. The overall MMA conversion was 94.5%.

GPC Analysis:
A- Mn=3300, Mw=4000, Mw/Mn=1.20
B- Mn=3200, Mw=3800, Mw/Mn=1.20;
HPLC Analysis:
B- PMMA-OH 14% and HO-PPMA-OH 86%;
NMR Analysis:
A- Actual MMA/end group=14.66 (theor 14.7)
Actual MMA/coupling agent=36.6 (theor. 29.4)
The three analyses show a substantial level of coupling even when no further catalyst is used for acylation.

EXAMPLE 11

Diphenyl Terephthalate Coupling of Polymeric SKA

The procedure of Example 9B was repeated with the following changes: MMA was polymerized with 50 μl of 0.033M Bu$_4$NOAc.HOAc.6 H$_2$O/THF catalyst, all of which was added at the start, and MMA feed took 1 h. Coupling was started 2 h after the completion of MMA feed, with 2.50 g diphenyl terephthalate (7.85 mmol) in 150 ml of very dry THF. The solution yellowed but there was little exotherm. Biacetate catalyst solution (100 μl, 0.033M) was added and the color darkened and the temperature rose 0.4° C. over the next 5 min.

All the polymer (sample A) was isolated, washed, and dried; recovery 26.1 g; 93.8% MMA conversion. Twenty g of A were dissolved in 100 ml of very dry THF and converted to α,Ω-dihydroxy-PMMA (sample B) by treatment with 5.1 ml of 10% (w/w) HCl/methanol for 3 h at RT. The polymer was isolated by precipitation in excess hexane, washing, and drying at RT and in a 65° C. vacuum oven.

GPC Analysis:
A- Mn=3200, Mw=3600, Mw/Mn=1.12;
B- Mn=3000, Mw=3300, Mw/Mn=1.13;
HPLC Analysis:
B- PMMA-OH 9.3% and HO-PMMA-OH 90.7%;
NMR Analysis:
A- Actual MMA/end-group=19.0 (theor. 14.7)
Actual MMA/coupling agent=34.3 (theor. 29.4)
The three analyses show substantial coupling.

EXAMPLE 12

Coupling of Polymeric SKA with Mixed Terephthalic/Benzoic Anhydride

A. Preparation of Mixed Anhydride of Terephthalic Acid and Benzoic Acid (TDB)

A 3-neck, 500-ml r.b. flask, equipped with a magnetic stirring bar, reflux condenser connected to nitrogen, and a pressure-equalizing dropping funnel, was flushed with nitrogen and held under a slightly positive nitrogen pressure. The flask was charged with 200 ml $CHCl_3$ (E. Merck), 20.0 g terephthaloyl chloride (Aldrich, 97%, MW=203.0, 0.099 moles assuming 100% purity), and 24.1 g benzoic acid (Aldrich, 99+%, MW=122.1, 0.197 moles). Triethylamine (20.0 g, Fisher, 0.198 moles) was dripped slowly into the stirred flask, and stirring continued 1½ h thereafter. After 7 ml of solution was consumed in solubility tests, the remainder was extracted with three 250-ml portions of deionized water, the lower chloroform layer filtered. Concentrating the chloroform solution with a rotary evaporator gave 34.5 g of product (theor. yield 36.9 g).

After small-scale recrystallization trials, which consumed 1.4 g of product, the solid was dissolved in 200 ml hot benzene and left at RT for 2½ days. The first crop was obtained by vacuum filtration. The mother liquor was concentrated to about 150 ml and a second crop obtained by filtration. A third crop was obtained after concentrating the mother liquor to ca. 75 ml. In all cases, an unusual melting point behavior of the samples suggests decomposition. At fast heating rates, the solids melt at about 140°–150° C. and resolidify, melting again only at about 280°–310° C. At slow heating rates, a slight amount of melting occurs at ca. 140° C., but most melts only at 280°–320° C. First crop: 23.3 g, mp=145°–150° C. and 280°–310° C. 2nd crop: 0.5 g, mp=148°–155° C. and 290°–310° C. 3rd crop: 3.9 g, mp >90° C. (never fully melts).

Elemental Analysis (first crop): C, 70.5%; H, 4.1%; O, 26.2%. Theory for $C_{22}H_{14}O_6$: C, 70.6%, H, 3.8%, O, 25.6%. $^1H$ nmr ($CD_2Cl_2$, δppm): 7.55 (t, 3.9H, $C_6H_5$-meta H), 7.7 (tt, 2.1 H, $C_6H_5$-para H), 8.15 (d, 4.0 H, $C_6H_5$-ortho), and 8.3 (s, 4.0 H, $C_6H_4$).

B. Coupling of Polymeric SKA

The procedure of Example 9B was repeated with the following changes: MMA was polymerized with 2.5 ml TTEB initiator (7.9 mmol) and 20 µl 0.04 M $Bu_4$NOAc.HOAc.$_6$ $H_2O$/THF catalyst, and MMA feed took 55 min. Coupling was started 3 h thereafter, with 1.47 g of TDB (first crop, 3.93 mmol) in 60 ml of very dry THF. The temperature rose 0.1° C., and 0.2 ml of biacetate catalyst was added. The temperature rose another 0.1° C. No aliquot was removed before hydrolysis to hydroxyl ends. Recovered PMMA (dried 48 h in a 65° C. vacuum oven), 23.8 g.

GPC Analysis:
Theor. Mn (100% conversion and coupling) =6400. $M_n$=3700, Mw=4900, Mw/Mn=1.33;
HPLC Analysis:
PMMA 1.0%, PMMA-OH 60.2% and HO-PMMA-OH 38.8%.
The two analyses show that Partial coupling occurred.

EXAMPLE 13

Coupling of Polymeric SKA with Bis(p-Nitrophenyl)terephthalate

A. Preparation of Bis(p-Nitrophenyl)terephthalate (DNPT)

A 300-ml r.b. flask, equipped with a magnetic stirring bar was charged with 7.85 g sodium hydroxide (Fisher, 0.197 moles) in 75 ml of deionized water and then, to the stirred solution, 27.40 g of p-nitroPhenol (Aldrich, 98%, 0.197 moles) was added. The solution turned orange and a considerable amount of yellow solid was present. A solution of 20.04 g of terephthaloyl chloride (Aldrich, 97%, 0.0987 moles assuming 100% purity) in methylene chloride was dripped into the flask from a dropping funnel. The flask was stirred another 15 min and the mixture filtered through a Whatman's #1 filter Paper disk on a Buchner funnel. The filtrate was almost clear and the solid on the filter was washed with a few portions of water in the funnel and with two small portions of acetone. The solid was dried by briefly drawing air through it in a vacuum funnel and then, broken into finer pieces, in a 65° C. vacuum oven. The crude product weighed 36.1 g (theory, 40.2 g) and melted at 228°–243° C.

Fifteen g of the product was dissolved in 2275 ml of THF at reflux; the solution was slightly Cloudy. Solid slowly crystallized on the walls of the flask upon cooling to RT and a first crop was obtained by vacuum filtration after leaving the flask overnight. The solid was dried 1 h in a 65° C. vacuum oven. A second crop was obtained by concentrating the mother liquor to about 200 ml and allowing the solution to cool.

First crop: 10.6 g, mp=245°–7° C. (lit. 242° C.; M. J. S. Dewar et al., J. Org. Chem., 35, 2711 (1970))
Second crop: 1.4 g, mp=241°–245.5° C.
Combined yield (adjusted for use of only 15.0 g of the 36.1 g crude product), 71.8%.

Elemental analysis (first crop): C, 59.2%, H, 4.0%; N, 6.2%, O, 30.2%. Theory for $C_{20}H_{22}N_2O_8$: C, 58.8%; H, 3.0%; N, 6.9%; O, 31.4%. $^1H$ nmr ($CD_2Cl_2$, δppm): δ7.6 (d, 4.0 H, $C_6H_4NO_2$, H meta to $NO_2$), δ8.4 (d and s, 7.7 H, terephthaloyl and $C_6H_4NO_2$, H ortho to $NO_2$).

B. DNPT Coupling of Polymeric SKA

The procedure of Example 12B was repeated except that coupling was begun 2.5 h after the MMA feed with 1.60 g of solid DNPT (7.9 mmol). Additional biacetate catalyst (100 µl) caused the temperature to rise 0.2° C. and a yellow color to appear temporarily. Much of the solid did not dissolve even overnight. The solid was filtered off and the polymer hydrolyzed to diol and isolated as usual. No aliquot was removed before hydrolysis.

GPC Analysis:
Theor. Mn (100% conversion and coupling)=6400
Mn=3100, Mw=3900, Mw/Mn=1.26;
HPLC Analysis:
Unknown 12.3%, PMMA-OH 70.4% and HO-PMMA-OH 17.2%.
The analyses indicate partial coupling.

EXAMPLE 14

Coupling of Polymeric SKA with Diphenyl Isophthalate

The procedure of Example 12B was repeated except that polymerization used 35 µl of 0.04 M $Bu_4$NOAc.-HOAc.6 $H_2O$/THF, and coupling was begun 4.5 h after the MMA feed, with 1.25 g diphenyl isophthalate (Polysciences, 3.9 mmol) in 12 ml of very dry THF. After a temperature rise of 0.1° C., 200 µl of biacetate solution was added and the temperature rose an additional 0.4° C. and the solution yellowed slightly. Recovered PMMA (dried 32 h in a 65° C. vacuum oven) weighed 25.0 g, a 98.1% conversion of MMA.

GPC Analysis:
Theor. Mn (100% conversion and coupling) =6400
Mn=3600, Mw=4300, Mw/Mn=1.20;
HPLC Analysis:
PMMA (0.8%), PMMA-OH (63.2%), and HO PMMA-PH (36.0%).
These analyses indicate partial coupling.

EXPERIMENT 2

Attempted Coupling of Polymeric SKA with Terephthaloyl Chloride

The procedure of Example 12B was repeated except that 35 μl of 0.04 M Bu$_4$NOAc.HOAc.6 H$_2$O/THF was used for polymerization, MMA feed took 45 min and coupling was started 4.75 h after the MMA feed with 1.1 ml triethylamine (Fisher, 99%, 7.8 mmol) and 0.82 g terephthaloyl chloride (Aldrich, 97%, 3.9 mmol) in 16 ml of very dry THF. The solution turned Yellow. There was a 0.1° C. rise, but 0.2 ml of biacetate solution caused no further change, and 2 ml of 0.04 M Bu$_4$NOAc (Fluka)/THF, added 1 h later, similarly caused no change. Recovered PMMA (dried 32 h in a 65° C. vacuum oven) weighed 22.2 g, an 86.4% conversion of MMA.

GPC Analysis:
Theor. Mn (100% basis) = 6400
Mn = 3000, Mw = 3500, Mw/Mn = 1.19;
HPLC Analysis;
PMMA 2.6% and PMMA-OH 97.4%.
These analyses show that no coupling occurred.

The above experiment was essentially repeated except that 4-dimethylaminopyridine in dry THF was used to absorb acidic by-products of a potential coupling reaction. Analysis of the recovered polymer again showed that no coupling had occurred.

EXPERIMENT 3

Attempted Coupling of Polymeric SKA with Terephthaloyl Bis(p-Toluenesulfonate)

The mixed sulfonic-carboxylic dianhydride, terephaloyl bis(p-toluenesulfonate), was Prepared according to C. G. Overberger and E. Sarlo, J. Am. Chem. Soc., 85, 2446 (1963). A pure sample, mp 173°–176° C. (lit. 174°–176° C.) was obtained.

The procedure of Example 12B was repeated in a 500-ml r.b. flask, except that coupling was begun 3.5 h after the MMA feed with 1.86 g of the mixed anhydride described above (3.9 mmol) in 190 ml of very dry THF. The temperature rose 1.1° C. When 0.2 ml of biacetate solution was added, there was no further exotherm and so another 0.8 ml was added over the next 10 min, without an effect on temperature.

GPC Analysis:
Theor. Mn (100% basis) = 6400
Mn = 3000, Mw = 3800, Mw/Mn = 1.29;
HPLC Analysis:
PMMA 39% and PMMA-OH 61%;
NMR Analysis:
No Me$_3$Si at δ0–0.1 ppm.
These analyses show that no coupling occurred, and that Me$_3$SiO groups were quantitatively converted to OH.

EXAMPLE 15

Sequential Terephthaloyl Fluoride Capping and Ethylene Glycol Finishing of Polymeric SKA The procedure of Example 12B was repeated except for the use of 35 μl of 0.04 M Bu$_4$NOAc.HOAc.6 H$_2$O/THF at the start of the MMA feed, and another 15 μl 10 min into the MMA feed, after 7 mL of MMA had been fed in. The MMA feed took 1 h.

Five hours after the MMA feed was completed, the solution was treated with 1.7 g terephthaloyl fluoride (TF$_2$) (10.0 mmol) in 10 ml of very dry THF. The temperature rose 0.1° C., and 0.2 ml of biacetate solution was added, causing the temperature to rise 1.5° C. and the solution to yellow slightly. The reaction mixture was left unstirred for 17 h at RT. For other purposes, 50 ml of solution was removed by syringe.

The remaining solution was treated at RT with 1.8 ml ethylene glycol (EG) (32.3 mmol) and 1.2 ml triethylamine (8.6 mmol), causing a 2.4° C. temperature rise. The solution was stirred 7 h then left unstirred at RT overnight. The solution was then treated, while being stirred, with 4.0 ml of 10% (w/w) HCl/MeOH (11 mmol of HCl), sufficient to render the mixture acidic. Solids were removed by filtration and the solution was concentrated as usual and poured into well-stirred hexane to cause polymer to precipitate. The polymer, dried 48h in a 65° C. vacuum oven, weighed 12.3 g. Polymer from the 50 mL sample removed earlier weighed 11.6 g. Recovered PMMA was thus 23.9 g.

GPC Analysis:
Theor. Mn (100% conversion and TF$_2$ and EG capping; no coupling) = wt MMA/moles TTEB + fragments of TTEB, TF$_2$, and EG = 2950 + 132 + 132 + 61 = 3300. Mn = 3400, Mw = 4200, Mw/Mn = 1.24;
HPLC Analysis
PMMA 1.4%; PMMA-OH 6.3% and HO-PMMA-OH 92.2%; the latter showed a double peak representing diol by coupling and finishing.
NMR Analysis (CDCl$_3$, δ ppm):
Theor. MMA/TF$_2$ end-group = d.p. before capping = 29.4
Actual MMA/TF$_2$ (MeO at δ3.55 vs. C$_6$H$_4$ at δ7.7 and 8.05) = 24.0
The δ7.7 multiplet represents TF$_2$-coupling (cf. Example 9B), and perhaps half of the protons of the TF$_2$-capping moieties. The δ8.0 multiplet represents TF$_2$ capping.

These analyses show that much of the polymer is capped, some is coupled, and most chains have 2 OH termini.

EXAMPLE 16

Sequential TF$_2$ Capping and 1,4-Butanediol (BDO) Finishing of Polymeric SKA The procedure of Example 12B was repeated except for the use of 35 μl of 0.04M Bu$_4$NOAc.HOAc.6 H$_2$O/THF and a 70-min MMA feed.

The polymer solution was treated with 1.34 g of TF$_2$ (7.9 mmol) in 10 ml of very dry THF, 4.5 h after the MMA feed. After 0.2 ml of biacetate was added, the temperature rose 2.0° C. and the solution yellowed slightly. The flask was stirred 1 h and left unstirred 17 h.

The stirred solution was then treated with 2.8 ml BDO (Aldrich, 31.6 mmol) and 1.2 ml triethylamine (Fisher, 8.6 mmol) and stirred 1 h at RT. A 1-ml aliquot was removed by syringe, injected into 0.5 ml of 10% (w/w) HCl/MeOH, evaporated to dryness, and redissolved in CH$_2$Cl$_2$. Polymer was isolated by filtration after,precipitation in excess hexane - Sample A.

The remaining solution was treated with 1.1 mL (9.5 mmol) of Aldrich 5-amino-1-pentanol, then hydrolyzed with 10 ml of 10% (w/w) HCl/MeOH and stirred 1 h at RT. It was concentrated to dryness in a rotary evaporator, the residue dissolved in 75 ml CH$_2$Cl$_2$, extracted with three 50-ml portions of deionized water and then with 50 ml saturated aqueous NaCl. The $CH_2Cl_2$ phase, about 75 ml in volume, was poured slowly into about 1.5 l of well-stirred hexane to precipitate polymer. The solid was vacuum filtered, washed 3 times with hexane and dried at RT and then in a 65° C. vacuum oven for 56 h - Sample B.

The combined PMMA samples weighed 24.7 g, representing a 91.8% conversion of MMA.

GPC Analysis:

Theor. Mn (100% conversion and $TF_2$ and BDO capping; no coupling) = wt MMA/moles TTEB = fragments of TTEB, $TF_2$, and BDO = 2950 + 132 + 132 + 89 = 3300.

A- Mn = 3600, Mw = 4600, Mw/Mn = 1.27;
B- Mn = 3000, Mw = 3700, Mw/Mn = 1.24;

HPLC Analysis:

A- PMMA or impurity 3.0%, PMMA-OH 4.1% and HO-PMMA-OH 92.9%:
B- PMMA or impurity 2.5%, PMMA-OH 5.2% and HO-PMMA-OH 92.3%. Two diol peaks representing capped and coupled products were obtained.

NMR Analysis ($CDCl_3$, δ ppm):

Theor. $MMA/TF_2$ end-group = 29.4
B- Actual $MMA/TF_2$ (δ3.55 vs. δ7.7 and 8.05) = 29.8
The δ7.7 multiplet represents $TF_2$ coupling and perhaps half of the protons of the $TF_2$-capping moieties. The δ8.05 multiplet represents $TF_2$-capping.

The analyses show that much of the polymer is capped, some is coupled, and most chains have hydroxyl groups at each end.

A separate experiment was run to prove that the above telechelic (dihydroxy) polymer can be chain-extended by coupling of the terminal hydroxyl groups.

A tared, dry 50-ml r.b. flask was stoppered with a serum-cap and cooled under argon. About 0.60 ml of molten bis(p-isocyanatophenyl)methane (MDI, Upjohn, Isonate 125 M), stored in a 50°-60° C. oven for 1 week, was injected into the flask with a syringe pre-warmed in the same oven. The weight of MDI, 0.622 g, was obtained by re-weighing the r.b. flask. $\alpha,\Omega$-Dihydroxy-PMMA, sample B prepared above, after drying for 3 days in a 65° C. vacuum oven, was weighed out quickly while hot. The stopper was briefly removed from the flask while 8.57 g of PMMA (ca. 1:1 mole ratio) and a magnetic stirring bar were introduced. Stoppered again, and under argon, the flask was charged with 10 ml of very dry THF.

The flask was stirred for 15 min to dissolve all ingredients and then 4 drops of dibutyltin dilaurate (T-12 Catalyst, M and T Chemical Co.), were added by disposable Pasteur pipette. No viscosity increase was seen after 5 min, but stirring was difficult after 15 min. After 1 h 20 min, a sample (C) was removed from the flask with a spatula.

The reaction flask was connected to a dried short-path still head and receiving flask, the assembly kept under argon. The reaction flask was heated to reflux to drive off the THF and then held in an oil bath at 115° C. for 0.5 h and at 107° C. for 3 h. It was then left at RT for 12 h. The solid residue was dissolved in the reaction flask in 25 ml THF. The solubility of the solid suggested that cross-linking reactions had largely been avoided. The solution was diluted further with 45 ml THF and dripped into 500 ml of well-stirred hexane, to precipitate polymer. The fibrous product was vacuum filtered and rinsed 3 times with hexane. After drying 40 h in a 65° C. vacuum oven, this sample (D) weighed 8.8 g. Samples C and D had a combined weight of 9.5 g.

GPC Analysis:

$\alpha,\Omega$-Dihydroxy-PMMA (sample B): Mn = 3000, Mw = 3700, Mw/Mn = 1.24;
C- Mn = 24,400, Mw = 72,700, Mw/Mn = 2.98;
D- Mn = 20,700, Mw = 64,800, Mw/Mn = 3.13;

Both C and D have low molecular weight peaks in the range of dihydroxy-PMMA representing about 5% of the peak area of the product. The results show that the dihydroxy-PMMA substrate contained a sufficient number of difunctional hydroxyl-terminated chains to be extended to high molecular weight polymer by reaction with MDI.

EXAMPLE 17

Coupling of Polymeric SKA with Bis(2,4-Dichlorophenyl Sebacate)

A. Preparation of bis(2,4-dichlorophenyl sebacate) (DCPSeb)

A 1000 ml round-bottom flask, equipped with a mechanical stirrer, pressure-equalizing dropping funnel, nitrogen inlet tube, and thermowell, was purged with and then held under a slightly positive pressure of nitrogen. The flask was charged with 300 ml of pyridine (dried over molecular sieves), and 23.2 ml of sebacyl chloride (0.10 moles, d = 1.121 g/ml, MW = 239.1, Aldrich, 92%) were syringed into the stirred solvent. A yellow solid precipitated. The dissolution of 32.92 g of 2,4-dichloro-phenol (0.2 moles, MW = 163.0, Aldrich, 99%) in 100 ml of dry pyridine was accompanied by a small exotherm. The solution was dripped slowly into the flask from the dropping funnel, without heat evolution. The flask was stirred for 6 h thereafter and left unstirred another 72 h.

The mixture was slightly acidified with 10% aq HCl. A fine solid precipitated which was isolated by vacuum filtration, rinsed twice with water on the funnel, and dried in part on the funnel. The slightly wet, waxy crude product weighed 66.2 g (theory, 49.2 g). The produce was tested with a variety of recrystallization solvents, then 31.7 g thereof was dissolved in 50 ml of THF and solid impurities removed by gravity filtration of the hot solution. Mixing with 500 ml of water gave 28 g of precipitate which was redissolved in about 80 ml of THF, the solution filtered through Celite ® to remove additional solid impurities. The clear THF solution was concentrated to about 50 ml and, still hot, brought to the point of just becoming cloudy by adding about 25 ml of methanol. The product which crystallized overnight was isolated by vacuum filtration, rinsed twice with 2:1 methanol/THF, and dried 1 h in a 65° C. vacuum oven. This first crop weighed 9.35 g. The filtrate was concentrated to 20 ml and 10 ml methanol were added. The second crop obtained from overnight crystallization was isolated as above and weighed 1.57 g. The 2 crops together weighed 10.9 g, a 46% yield (theoretical yield, 23.6 g, based on 31.7 g of crude product). The products were further purified by dissolving both crops in 50 ml of hot ethyl acetate, filtering out impurities, concentrating to about 15 ml, and adding 8 ml of hexane to reach the cloud point. Solids began to appear in 1 h and were voluminous in 3 h. The solid was isolated by vacuum filtration, rinsed with 2:1 ethyl acetate/hexane, and dried on the filter and then for 1 h in a 65° C. vacuum oven with slight nitrogen bleed. It weighed 4.3 g (18.3% yield), its elemental analysis and proton NMR spectrum consistent with theory. Calcd. for $C_{22}H_{22}O_4Cl_4$: C, 53.7; H, 4.5; O, 13.0; Cl, 28.8. Found: C, 54.2; H, 4.7; O, 13.1; Cl, 27.7. Proton NMR (CDCl$_3$, δppm): δ1.4 (m, 8.6 H), 1.8 (pentet, 4.0 H), 2.6 (t, 4.0 H), 7.0 (d, 2.0 H), 7.2 (dd, 2.2 H), 7.4 (d, 1.8 H). Melting points: first crop-95°-98.5° C., re-recrystallized, 97°-98.5° C.

B. DCPSeb Coupling of Polymeric SKA

The procedure of Example 9B was repeated twice, with changes noted below:

|  | Sample A | Sample B |
|---|---|---|
| TTEB initiator, ml (mmol) | 2.5 (7.9) | 2.5 (7.9) |
| 0.04M Bu$_4$NOAc.HOAc.6H$_2$O/THF, μl | 30 | 60 |
| MMA feed time, min | 65 | 65 |
| Coupling begun after (h) | 2.5 | 3.5 |
| Re-recrystd. DCPSeb/THF, g (mmol)/ml | 1.94 (3.9)/50 | 1.94 (3.9)/20 |
| Temperature rise. °C. | 0 | 0 |
| 0.04M Bu$_4$NOAc.HOAc.6H$_2$O/THF, ml | 0.2 | 0.5 |
| Additional temperature rise. °C. | 0.4 | 1.1 |

The solutions were left for 18 h and then the polymer was hydrolyzed to hydroxyl end-groups by stirring each with 5 ml of 10% HCl/methanol for 1 h at room temperature. No aliquot was removed prior to hydrolysis. The polymer was precipitated and isolated as above and dried to constant weight in a 65° C. vacuum oven, yielding 24.6 g of Sample A. Only a portion of Sample B was so isolated for GPC and HPLC analysis.

GPC Analysis:
Theor. Mn (100% conversion and coupling) = 6400
Sample A- Mn = 3200, Mw = 4500, Mw/Mn = 1.38;
Sample B- Mn = 3600, Mw = 4500, Mw/Mn = 1.26;
HPLC Analysis:
Sample A- PMMA 1.2%, unknowns 31.7%,
PMMA-OH 25.9: and HO-PMMA-OH 41.2%;
Sample B- PMMA 1.8%, unknown 21.0%,
PMMA-OH 17.4% and HO-PMMA-OH 59.7%.
The analyses indicate coupling.

EXAMPLE 18

Coupling of Polymeric SKA with Bis(2,4-Dichlorophenyl)terephthalate

A. Preparation of bis(2,4-dichlorophenyl)-terephthalate (DCPT)

The nitrogen-purged apparatus described in Example 17A for the preparation of DCPSeb was charged with 300 ml of molecular sieves-dried pyridine and 20.3 g of terephthaloyl chloride (0.10 moles, MW = 203.0, Aldrich, 97%), which gave a cloudy, yellow mixture. A solution of 32.6 g of 2,4-dichlorophenol (0.20 moles) in 100 ml of dry pyridine was dripped into the stirred mixture over 15 min, causing a 1.3° C. exotherm. The mixture thickened and turned white. It was stirred 6 h more and left unstirred overnight. The mixture was slightly acidified with 10% aq HCl, the crude product isolated from it by vacuum filtration, then rinsed twice with ethanol on the funnel and dried on the funnel to 62 g of slightly wet solid. The product gave a hazy solution in 1200 ml of hot THF, which was filtered hot. After 2 h, a first crop of recrystallized solid was isolated by vacuum filtration and rinsed with a minimum of THF. More solids appeared in the filtrate after concentration to 200 ml. A second crop was taken as above after crystallization. The 2 crops were dried on their respective filtration funnels and then overnight at room temperature in a vacuum oven with a slight nitrogen bleed. The combined weight, 27.1 g, was 60% of the theoretical 45.6 g. Elemental analysis is consistent with theory. Calcd. for $C_{20}H_{10}O_4Cl_4$: C, 52.7; H, 2.2; Cl, 31.1. Found: C, 52.8; H. 2.2; Cl, 31.5.

Yields and melting points:
first crop- 21.5 g, 220°-221.5° C.
second crop- 5.6 g, 219°-222.5° C.

B. DCPT Coupling of Polymeric SKA

The Procedure of Example 9B was repeated with the following changes. MMA was polymerized with 2.5 ml TTEB initiator (7.9 mmol) and 30 microlitres of 0.04 M Bu$_4$NOAc.HOAc.6H$_2$O/THF catalyst, and MMA feed took 80 min. Coupling was begun 3 h thereafter with 1.80 g (3.9 mmol) of the first crop of recrystallized DCPT in 250 ml of very dry THF and 0.2 ml of 0.04 M biacetate catalyst, the temperature rising 1° C. because of the warmth of the DCPT solution. After 18h, the polymer was hydrolyzed to hydroxyl end-groups by stirring 1 h at room temperature with 5 ml of 10% HCl/methanol. No aliquot was removed prior to hydrolysis. The recovered, 65° C. vacuum oven-dried PMMA weighed 28.5 g.

GPC Analysis:
Theor. Mn (100% conversion and coupling) = 6400
Mn = 4800, Mw = 5700, Mw/Mn = 1.18;
HPLC Analysis:
PMMA 4.6%, unknown 22.5%, PMMA-OH 10.1% and
HO-PMMA-OH 62.9%.
The analyses indicate coupling.

We claim:

1. A compound having the formula

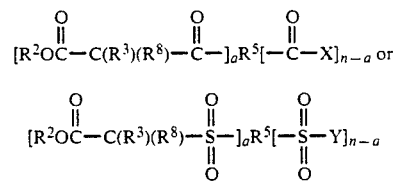

respectively, wherein:
R$^2$ is a hydrocarbyl, substituted hydrocarbyl, or a polymeric radical;
R$^3$ is H, hydrocarbyl or substituted hydrocarbyl;
R$^5$ is a hydrocarbyl, substituted hydrocarbyl or polymeric radical, of valence n, wherein the carbon adjacent to the

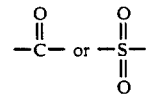

is not part of a carboncarbon double or triple bond;
R$^8$ is a polymeric radical comprised of acrylic monomer units;
X is —F, —OAr or —C(O)R$^6$ wherein Ar is phenyl or substituted phenyl and R$^6$ is a hydrocarbyl or substituted hydrocarbyl radical;
Y is —F or —OAr;
Ar is aryl or substituted aryl;
n is an integer of at least 1; and
a is an integer of at least 1 but not greater than n.

2. Compound of claim 1 wherein a is equal to n.

3. Compound of claim 1 wherein a is less than n.

4. Compound of claim 1 wherein n is 2 and a is 1 or 2.

5. Compound of claim 2 wherein $R^8$ contains a functional substituent that is inert under polymerization conditions.

6. Compound of claim 3 wherein $R^8$ contains a functional substituent that is inert under polymerization conditions.

7. Compound of claim 4 wherein $R^8$ contains a functional substituent that is inert under polymerization conditions.

8. Block copolymer formed by chain extension of the product of claim 5.

9. Block copolymer formed by chain extension of the product of claim 7.

* * * * *